Sept. 4, 1956  F. A. KROHM  2,761,168
WINDSHIELD WIPER BLADE CONNECTOR
Filed July 3, 1952

INVENTOR.
FRED A. KROHM
BY
Charles S. Penfold
ATTORNEY

United States Patent Office 2,761,168
Patented Sept. 4, 1956

2,761,168

WINDSHIELD WIPER BLADE CONNECTOR

Fred A. Krohm, Hobart, Ind., assignor to Productive Inventions, Inc., a corporation of Indiana Application July 3, 1952, Serial No. 297,099

12 Claims. (Cl. 15—250)

This invention relates to windshield wiper arm and blade assemblies, and more particularly to devices for connecting a windshield wiper blade to a windshield wiper arm.

An object of the invention is to provide a connector to be mounted on a windshield wiper blade whereby a windshield wiper arm may be readily inserted and locked securely in such connector, for longitudinal movement of said blade with relation to said arm, under such conditions that that relationship may not be broken normally without intentional manipulation.

Another object of the invention is to provide a connector with spaced-apart abutment means which may embrace an arm end with sufficient play between said means and said arm end to permit free movement of the arm between said abutment means and substantially in a plane of the respectively longitudinal axes of said arm end and of said blade, without permitting sufficient lateral movement of said abutment means, with relation to said arm, to permit an undesirable degree of rotation of the wiper blade, on its axis, with relation to the arm and with relation to a windshield being wiped.

Other objects of the invention are: to provide a connector which may be manufactured economically; to provide a connector which may be attached securely to a wiper blade with a minimum of effort and labor cost; and to provide a connector which may readily be so securely attached to a wiper blade as to prevent loosening of that attachment under abnormal shocks such as the non-uncommon striking of the blade against a windshield frame as may be caused by wear and "slop" in the linkage of a windshield wiper power mechanism or by excessive speed of operation and consequent whipping of the windshield wiper blade.

Another object of the invention is to provide a connector having a cavity in which an arm is received and held and having also a continuous exterior wall providing an unbroken shield resisting the accumulation of foreign matter within the cavity, protecting the end portion of the arm against accidental displacement from the connector upon handling by servicemen, and providing a smooth exterior surface, thus minimizing danger of abrasion of contacting skin of a service operator and offering minimum obstruction for engagement with cloths used for cleaning windshields.

Another object of the invention is to provide means of connection of a blade with an arm that will permit the driving portion of the arm to extend downwardly to minimize the distance between that portion and the windshield, whereby to reduce the torsional load on the arm.

A particular object of the invention is to provide a novel yieldable locking means having a component slidably and rotatably mounted on the housing of the connector and resilient means for normally maintaining the component in a locking position.

An important object of the invention is to provide a unique arrangement whereby any force tending to accidentally separate the blade unit from the arm unit will develop a holding action in addition to that produced by the yieldable locking means.

A further object of the invention is to provide the connector housing with means for guiding the free end of a wiper arm into the housing and wherein the guiding means serves to hold the resilient means in the housing.

A further object of the invention is to provide a support for the connector, and attach the connector thereto in a manner whereby to reenforce the support.

A significant object of the invention is to construct the locking component of the yieldable locking means in two parts, which parts are so formed that they can be readily assembled with one another and in a novel manner with the connector housing.

Figure 1:
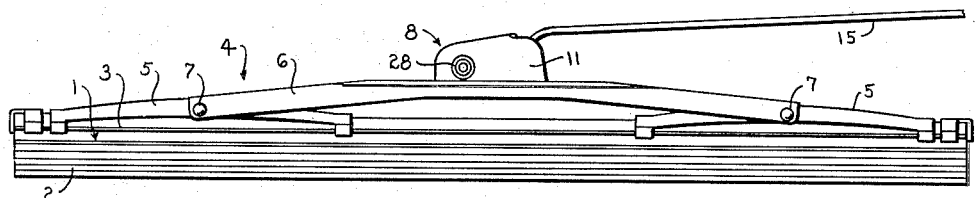
Figure 1 is a side view of a well-known type of windshield wiper blade having a primary yoke or bridge provided with a connector and showing a portion of an arm extending into the connector.

This application contains subject matter related to that in my copending application, Serial No. 324,299, filed December 5, 1952. In the copending application the connector housing is mounted on the blade unit whereas in the subject application the connector housing is mounted on a pressure unit of the blade assembly.

Referring more particularly to the drawings, numeral 1 generally designates a flexible blade unit comprising a resilient wiping element 2 and a uniformly resiliently flexible support 3 therefor. A pressure unit generally designated 4 for conforming the blade unit to a surface to be wiped includes a pair of secondary yokes 5 having their ends connected to the blade unit. The pressure unit also includes a primary yoke 6 having its ends pivotally attached to intermediate portions of the secondary yokes by pivot means 7. The pivotal connections between the primary yoke and secondary yokes are preferably such that the primary yoke may slightly rock or pivot about its longitudinal axis as the blade unit is moved back and forth across a windshield or other surface to be wiped.

The blade assembly includes the blade unit and pressure unit and the primary yoke of the latter provides an elongated support for a connector generally designated 8 which by itself and in combination with the yoke constitutes the subject matter of the invention.

The connector includes a housing and yieldable locking means generally designated 9 and the arm unit includes a curved entering part 10, all of which will now be described in detail.

Figure 2:
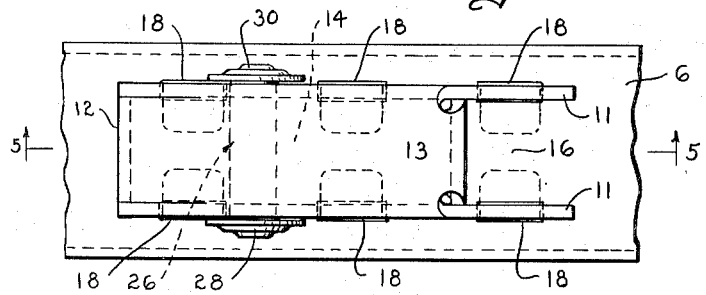
Figure 2 is an enlarged top view of a portion of the blade with the arm removed.

The housing of the connector is generally tapered in formation and preferably constructed in one piece. More particularly, the housing includes corresponding spaced apart parallel side walls 11, an end wall 12, and an inclined top wall 13 provided with an inturned continuation or re-entrant portion 14, the latter constituting a guide assisting to locate the entering part 10 on a wiper arm 15 in the housing. The inturned portion 14, side walls 11 and the yoke 6 form an enclosure open at its rear for receiving the entering part. The central area of this yoke provides a bearing surface 16 for the entering part 10. It will be noted that the length of inclined top wall 13 of the housing is slightly shorter than the length of the side walls 11 and that the inturned portion 14 is disposed at an acute angle with reference to the top wall and angularly with respect to the bearing surface 16 on the primary yoke. Each of the side walls is preferably provided with a plurality of fingers 17 which project downwardly through apertures 18 provided in the primary yoke 6 and are inturned in clamping relationship with the underside of the yoke for permanently securing the connector housing thereto as clearly illustrated in Figures 2, 4 and 5.

The entering part 10 of the arm is curved and of a width slightly less than the space between the side walls 11 of the connector housing so that the walls serve as abutments to limit side play between the connector and arm. The entering part is of a predetermined thickness and has an upper surface 19 and a lower surface 20. The free end of the part is provided with a lug 21 extending upwardly from the upper surface 19. The lug is provided with a rounded cam surface 22 and a surface 23 as clearly shown in Figure 5.

Each of the side walls 11 is provided with a slot 24 which is disposed at an angle with reference to the bearing surface 16 on the yoke 6. These slots are identical as to size, shape and location and serve as guideways for the yieldable locking means 9.

The yieldable locking means 9, includes a leaf spring generally designated 25 and a component generally designated 26. This component extends cross-wise through the slots 24 and is rotatable and slidable therein. The component includes a tubular cylindrical member 27 having a circular end flange 28 and a pin member or element 29 having a shank, securable in the member 27, and a circular end flange 30 corresponding in size to the flange 28. These members when assembled simulate the appearance of a dumbbell.

To assemble members 27 and 29 with one another and to the connector housing is a simple matter. The cylindrical member 27 is first inserted through the slots 24 and then the shank of the pin member is pressed fitted into the cylindrical member. The end flanges 28 and 30 limit the extent of the axial movement of the component in the slots, and provide means which can be readily engaged by the fingers of a hand for manually retracting the locking means to release the entering part 10.

Figure 4:
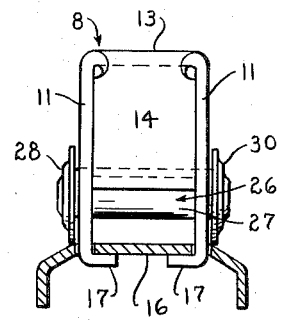
Figure 4 is an enlarged transverse sectional view taken substantially on line 4—4 of Figure 3.
Figure 3:
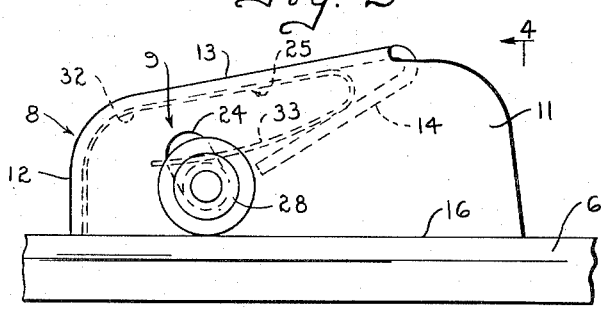
Figure 3 is an enlarged side view of that portion of the blade illustrated in Figure 2.
Figure 6:
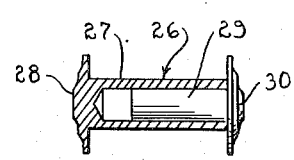
Figure 6 is a longitudinal section of a locking means constituting a component of the yieldable locking means utilized for detachably connecting the blade unit with the arm unit.

The leaf spring 25 constituting a part of the yieldable locking means may be constructed in various ways but as shown includes a portion 31 which engages the yoke 6 and the end wall 12 of the housing, an inclined portion 32 engaging the top wall 13 and an inturned operative portion 33 engaging the continuation 14. The portion 33 is placed under tension by engaging the component 26 and normally forces the component downwardly in a locking position so that the component engages the bottom ends of the slots 24 or so the circular flanges 28 and 30 will engage the yoke 6 as illustrated in Figures 3 and 4.

Figure 5:
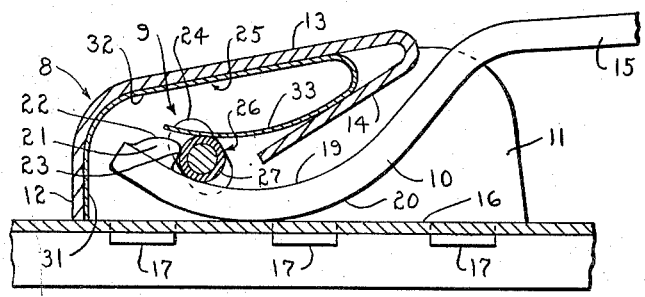
Figure 5 is an enlarged longitudinal section taken substantially on line 5—5 of Figure 2 with the arm in an operable position.

To connect the arm unit to the blade unit, the curved entering part 10 is inserted into the connector until the end of the part engages the component 26. Further inward movement of the entering part will cause the cam surface 22 on the lug 21 to automatically cam the component upwardly and when the part reaches its innermost position as illustrated in Figure 5, the component will snap downwardly and serve as an abutment for engagement with the surface 23 of the lug to positively lock the blade unit to the arm. The pressure exerted by the yieldable locking means is sufficient to normally maintain the under surface 20 of the entering part in line contact with the bearing surface 16 on the yoke 6 when the blade unit is being oscillated across a surface to be cleaned. All play between the entering part and connector is reduced to a minimum in accommodation of manufacturing tolerances.

Due to the angular direction of movement and character of the entering part of the locking means any accidental pull tending to separate the units will cause the lug 21 to force the locking component downwardly against the part and the latter against the bearing 16. Thus, any force tending to accidentally separate the units serves to develop a holding action in addition to that produced by the yieldable locking means. The arrangement is such that any increased force in this respect correspondingly increases the holding action. This unique setup provides a positive lock for holding the units operatively connected so that the blade unit may readily pivot about a transverse axis to enable the wiping element to adjust itself to a surface to be cleaned. When the entering part 10 is being inserted into the connector, the component 26 may in some instances be caused to rotate slightly about its axis in the slots. This rolling action promotes entry of the entering part in the connector.

To disconnect the units, it is merely necessary to manually grasp the end flanges 28 and 30 of the component 26 and lift the component clear of the lug 21 and then pull the units apart.

While I have shown and described in detail only one form of my invention I do not desire to be limited to the particular constructions and arrangement exemplified, but intend to cover all embodiments of my invention falling within the terms of the appended claims.

I claim:

1. In a windshield wiper arm and blade assembly and in combination, an arm and a blade, a connector mounted on the blade, said connector having spaced-apart side walls providing a recess therebetween for receiving through an entrance thereto an end portion of said arm formed irregularly in a plane normally perpendicular to and normally longitudinally aligned with an adjacent portion of said arm, said arm being of slightly less width than the space between the inner sides of said recess, said end portion of said arm being provided with an abutment generally facing back toward said arm, said connector being provided with abutment means and guide means, a locking member disposed between said side walls and cooperating with said guide means, said guide means being constructed and arranged to permit limited displacement of said locking member in a path bearing upward and away from the entrance of said recess, said locking member being held normally at the bottom of said guide means and against said abutment means so that upon insertion of the arm in said connector said locking member is displaced along said path, as the arm moves under it, and falls back toward said arm after said abutment has passed it, whereby to provide a wedging locking action of said locking member between the guide means and said abutment on said arm to prevent accidental displacement of said arm from said connector.

2. In a connector for attaching a blade to a windshield wiper arm; a housing having side walls; a locking member movable with relation to said housing and carried thereby, said locking member having a portion disposed to be engaged by abutment means carried by a windshield wiper arm; means for constraining the movement of said portion of said locking member to a path bearing away from the longitudinal axis of a blade; abutment means carried by said housing for limiting displacement of said locking member from said path; and spring means for urging said locking member in a direction toward one extremity of the path so that when the arm is inserted between the side walls the abutment means on the arm may engage the locking member to prevent removal of the arm from the housing.

3. A connector for establishing a detachable connection between a windshield wiper blade and a wiper arm, said connector comprising an elongated housing having side walls, a top wall and an end wall so as to provide an entranceway at one end of the connector, slots provided in the side walls, a locking member slidably mounted in the slots, and resilient means bearing against the member and disposed for non-engagement by a wiper arm.

4. The structure defined in claim 3, in which the housing is provided with an inturned portion which serves to hold the resilient means in the housing and guide an entering part on a wiper arm into locking relationship with the locking member.

5. A windshield wiper blade unit comprising a resilient wiping element and a support therefor, a pressure device mounted on the blade unit and including an elongated support, a housing carried by said support and forming therewith an enclosure for an entering part of a wiper arm, a cross-member slidably mounted on the housing for movement transversely of the elongated support for holding such an entering part in the housing, abutment means provided on the enclosure, and resilient means for normally maintaining the cross-member in a locking position so that the entering part will be detachably held by the abutment means and cross-member when inserted therebetween.

6. A connector for establishing a detachable connection between a windshield wiper blade unit and a wiper arm, said connector comprising an elongated housing having side walls, slots provided in said side walls and arranged at an angle with reference to the longitudinal axis of the housing, a locking means slidably mounted in the slots for retaining an entering part on a wiper arm in the housing, the arrangement being such that the locking means will be pulled against such a part when an attempt is made to withdraw it from the housing, and resilient means for normally maintaining the locking means in a predetermined position in the slots.

7. A support provided with an upper bearing surface, a housing secured to the upper side of the support, said housing having a pair of spaced apart side walls, an end wall, and an inclined top wall provided with an inturned continuation, a slot provided in each of the side walls, a cross-member extending through the slots, a leaf spring having portions engaging the end and top walls and the continuation, said spring also including a portion forcibly pressing the cross-member to a predetermined position for holding an entering part between the cross-member and said bearing surface.

8. A windshield wiper blade assembly provided with a support having a bearing surface, a housing secured to the support, locking means arranged substantially in the housing, means for controlling the locking means for movement in an angular direction toward the bearing surface for holding an entering part against said surface, and resilient means for influencing the movement of the locking means toward an entering part.

9. In combination: a wiper blade unit having a support provided with a bearing surface, a housing secured to the support, yieldable locking means arranged substantially in the housing for movement in an angular direction toward the bearing surface, a wiper arm unit having a curved entering part disposed substantially within the confines of the housing with the locking means forcibly pressing the entering part against the bearing surface on said support, and a lug carried by the entering part engageable with the locking means preventing accidental separation of the units, the arrangement being such that any force tending to accidentally separate the units will cause the lug to pull the locking means against the entering part and the entering part against the bearing surface to produce a holding action to prevent separation of the units.

10. An assembly for establishing a connection between a wiper blade unit and a wiper arm unit, said wiper blade unit including an elongated support having a relatively weak central portion provided with an upper bearing surface, openings provided in the central portion, a housing having side walls provided with projections extending through the openings and clamped against the underside of the central portion for permanently securing the housing to the portion and for reenforcing such portion, and yieldable locking means arranged substantially in the housing for forcing an entering part on a wiper arm unit against the said bearing surface.

11. A windshield wiper blade assembly, a connector mounted on the blade assembly, said connector having side walls provided with guide means disposed at an acute angle with reference to the longitudinal axis of the support, bearing means disposed between the side walls, and yieldable locking means carried by the side walls and guided by said guide means for movement at said angle toward the bearing means for holding an entering part on a wiper arm against the bearing means.

12. A windshield wiper blade assembly including an elongated resilient wiping element and an elongated member operatively associated with said element, a connector housing mounted on the blade assembly and provided with means for detachably holding an entering part of a wiper arm in the connector housing and against the member.

References Cited in the file of this patent

UNITED STATES PATENTS

| 749,438 | Harrington | Jan. 12, 1904 |
| 1,183,425 | Ballow | May 16, 1916 |
| 2,087,686 | Horton | July 20, 1937 |
| 2,260,905 | Horton | Oct. 28, 1941 |

FOREIGN PATENTS

| 466,418 | Canada | Oct. 28, 1941 |
| 657,822 | Great Britain | Sept. 26, 1951 |